US008638642B2

(12) United States Patent
Cade

(10) Patent No.: US 8,638,642 B2
(45) Date of Patent: Jan. 28, 2014

(54) IDENTITY TRACKING PROCESS AND SYSTEM

(75) Inventor: Neil Cade, Luton (GB)

(73) Assignee: Selex ES Ltd, Essex (GB)

( * ) Notice: Subject to any disclaimer, the term of this patent is extended or adjusted under 35 U.S.C. 154(b) by 551 days.

(21) Appl. No.: 12/991,084

(22) PCT Filed: May 5, 2009

(86) PCT No.: PCT/EP2009/055431
§ 371 (c)(1),
(2), (4) Date: Dec. 27, 2010

(87) PCT Pub. No.: WO2009/135849
PCT Pub. Date: Nov. 12, 2009

(65) Prior Publication Data
US 2011/0098994 A1    Apr. 28, 2011

(30) Foreign Application Priority Data

May 6, 2008 (GB) .................................. 0808175.4

(51) Int. Cl.
G01S 3/80    (2006.01)

(52) U.S. Cl.
USPC ........................................................ 367/128

(58) Field of Classification Search
USPC ................................................ 367/141–190
See application file for complete search history.

(56) References Cited

U.S. PATENT DOCUMENTS

| 4,081,785 | A | 3/1978 | Ravis et al. |
| 5,107,250 | A | 4/1992 | Pykett |
| 5,604,683 | A | 2/1997 | Roecker |
| 5,880,691 | A | 3/1999 | Fossum et al. |
| 2002/0030623 | A1 | 3/2002 | Arikan et al. |
| 2005/0068199 | A1* | 3/2005 | Succi et al. ................... 340/933 |
| 2011/0006943 | A1* | 1/2011 | Shaffer ......................... 342/146 |

FOREIGN PATENT DOCUMENTS

DE    195 42 871 C1    11/1996

OTHER PUBLICATIONS

International Search Report (PCT/ISA/210) issued on Oct. 28, 2009, by European Patent Office as the International Searching Authority for International Application No. PCT/EP2009/055431.
Written Opinion (PCT/ISA/237) issued on Oct. 28, 2009, by European Patent Office as the International Searching Authority for International Application No. PCT/EP2009/055431.
United Kingdom Search Report issued on Sep. 19, 2008.
Alireza A. Dibazar et al., "The Application of Dynamic Synapse Neural Networks on Footstep and Vehicle Recognition", Proceedings of International Joint Conference on Neural Networks, Aug. 12-17, 2007, pp. 1841-1845.

(Continued)

Primary Examiner — Luke Ratcliffe
(74) Attorney, Agent, or Firm — Buchanan Ingersoll & Rooney PC

(57) ABSTRACT

A method of identifying and tracking a target is described, in which seismic data relating to a target is passively detected and processed using statistical means. The statistical manipulation of the data includes frequency information extraction, dynamical mixture model construction based on existing known data and identification of an unknown target by the convergence of this model to a state characteristic of that target.

16 Claims, 12 Drawing Sheets

Example of the seismic data (at two different resolutions) collected by a single sensor. Here the increase in signal in the middle of the series is due to the close approach of the vehicle to the sensor before passing on by and disappearing into the distance.

(56) References Cited

OTHER PUBLICATIONS

Burhan F. Necioglu et al., "Vehicle Acoustic Classification in Netted Sensor Systems Using Gaussian Mixture Models", Proceedings of the SPIE—The International Society for Optical Engineering, Automatic Target Recognition XV, Mar. 29, 2005, pp. 409-419.

Mahdi Sabri et al., "Audio Noise Detection Using Hidden Markov Model" IEEE, 2003, pp. 637-640.

Paul Gaunard et al., "Automatic Classification of Environmental Noise Events by Hidden Markov Models", IEEE, 1998, pp. 3609-3612.

Graham L. Goodman, "Detection and Classification for Unattended Ground Sensors", IEEE, 1999, pp. 419-424.

Asma Rabaout et al., "Automatic Environmental Noise Recognition", IEEE International Conference on Industrial Technology (ICIT), 2004, pp. 1670-1675.

Khen-Sang Tan et al., "Error Correction Techniques for High-Performance Differential", IEEE Journal of Solid-State Circuit, Dec. 1990, vol. 25, No. 6, pp. 1318-1327, XP-000176559.

Ito et al., "Zero-Crossing Measurement for Analysis and Recognition of Speech Sounds" IEEE Transactions on Audio and Electroacoustics, (1971), vol. AU-19, No. 3, pp. 235-242.

Yan et al., "Approximate Entropy as a Diagnostic tool for Machine Health Monitoring" Mechanical Systems and Signal Processing, (2007), vol. 21, Issue 2, pp. 824-839.

\* cited by examiner

Figure 1 Example of the seismic data (at two different resolutions) collected by a single sensor. Here the increase in signal in the middle of the series is due to the close approach of the vehicle to the sensor before passing on by and disappearing into the distance.

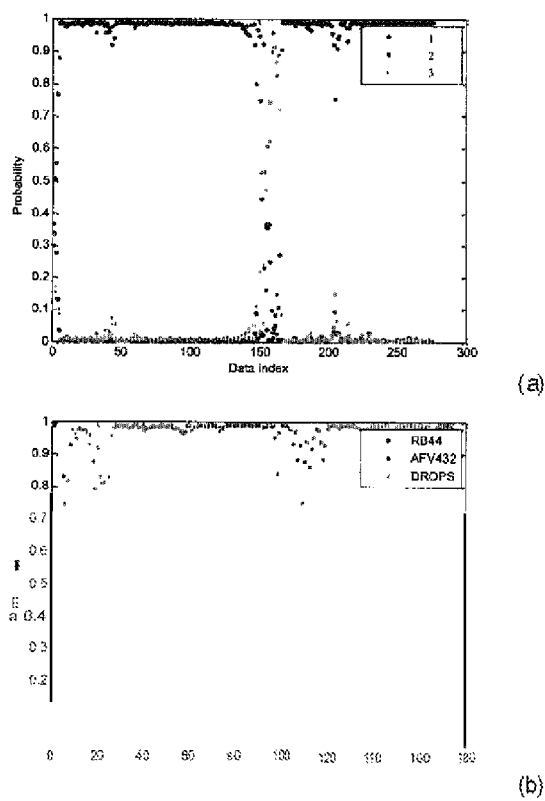
Figure 10 Classification results for two sets of data that were not used in the fitting of the data models in section Error! Reference source not found. but for two of the vehicles used for that model building with different sensor placements.

IDENTITY TRACKING PROCESS AND SYSTEM

The invention relates to an identity tracking process and system. More specifically, but not exclusively the invention relates to a process whereby passive interceptions of emissions from sources acquired over a period of time may be used to distinguish and identify different sources.

Seismic sensors offer the potential of being able to detect, classify and track vehicles and people moving, in an environment cluttered by vegetation or buildings, at greater range than could be achieved with more conventional acoustic sensors. Seismic sensors measure the vibrations associated with such movements that propagate through the earth rather than through the air. Although the earth provides a stationary medium it is very inhomogeneous, anisotropic, dispersive and lossy. Detection of these vibrations using seismic sensors and subsequent processing of the data can enable identification and tracking of the source in question.

Known identity tracking processes and systems utilise some of the aspects of the invention to be described below. However, none fully perform the function of the present invention as described.

For example, in the present invention data filtering is important in suppressing out of band data and zeroing any sensor offset. This might be done by many means but in particular it might be performed using a Kalman filter. There is a large amount of prior art relating to such filters, none of which detail a method of using such filters in the manner described below.

In a further example, the use of a zero-crossing method for extracting frequency information is well known in the realm of natural language processing and speech recognition, see for example Ito M R and Donaldson R W. Zero-Crossing Measurements for Analysis and Recognition of Speech Sound. IEEE Transactions On Audio And Electroacoustics vol. AU-19, (1971) but is used here in a much more general context. While its usefulness in providing a fast and robust spectral analysis in that context is clearly demonstrated, its usefulness in more general signal processing has not been previously suspected. Indeed fast Fourier processing algorithms are generally the favoured method for frequency analysis. In our case the use of a zero crossing method is proposed not so much because of its speed but because of its unexpected and vastly superior performance.

It is generally the case that probabilistic data representations can be represented in terms of their sufficient statistics such as mean, variance, kurtosis, entropy, if only because they provide a more compact representation of the probabilities in at least Yan, R and Gao, R X. Approximate Entropy as a diagnostic tool for machine health monitoring. Mechanical Systems and Signal Processing 21, Issue 2, (2007). In the disclosed invention, it is the whole cumulative probability distribution that is used as the feature vector even with discrete frequencies defined by the zero crossing process, this is a high-dimensional vector but rather than making some heuristic dimensional reduction choice at this stage this invention leaves the reduction to be driven by the data itself.

In a further known aspect, the construction of mixture models for emission data represented in terms of the probability distribution of frequencies can be performed by a large number of methods. In particular, because of the efficiency with which they may be constructed, Gaussian mixtures might be constructed using the EM algorithm as shown in McLachlan, G J and Krishnan, T. The EM Algorithm and Extensions. Wiley Series in Probability and Statistics (1996). Here the essential innovation is not in the process of forming a mixture model but rather in the use of a mixture model to describe the range of emission characteristics, modified by disturbances and filtered by environmentally variable propagation characteristics.

The components of mixture models are used effectively as data for the construction of a dynamic model of each emitter. This step is again novel and is used to describe the evolution of features. This fitting might again be performed using the EM algorithm but again the novelty lies in the idea of use and the application rather than fitting algorithm Identification is then performed on the basis of a conventional (maximum likelihood or maximum posterior probability) fitting of the model to a specific data sequence. In this it should be noted that although it may be expedient to use only a static model for each emitter taking account of only the mean occupancies of the component modes, it is necessary to retain some minimal dynamic behaviour in the form of identity switching to ensure numerical robustness in the presence of model imperfection.

Accordingly, there is provided a process for identifying and tracking targets comprising the steps of detecting emissions emitted by the target, processing the emissions data detected using a series of statistical manipulations and identifying and tracking the target in which the emissions detected are of a seismic nature and are detected passively by seismic sensors.

The process, as described in more detail below, comprises a number of key features that enable it to process the data sufficiently fast for real-time applications but retaining a sufficiently high dimensional data representation that the process is resilient to systematic biases such as might be caused by variations in background noise differences in sensor placement and diverse weather conditions.

The process aims to overcome the problems associated with the prior art, in particular the following points should be noted.

The process described makes use of band-pass filtering to remove both high and low frequencies known not to be characteristic of the sources. Advantageously, this automatically removes DC sensor offsets.

This filtered data is segmented into windows comprising several panes of data with the windows chosen to be short enough to correspond to essentially stationary emitter frequency information but long enough to comprise enough panes that the pane data is sufficient to provide not just mean frequency information but a measure of the variability of the information.

Furthermore, extraction of representative frequency information in the filtered signal data is achieved by using a zero-crossing counting method that enables the extraction of the highest significant frequency of short sample panes. Thus the method extracts data features in the form of the dominant frequency of the pane and the variability of this frequency between neighbouring panes. This captures the spectral characteristics of the data in a way that is much less sensitive to noise than more conventional spectral analysis methods, without using knowledge of the expected source as would be needed for such more conventional methods where similar insensitivity could only be achieved by having to tightly filter the data.

Moreover, the extracted data is represented in terms of feature vectors that are the discrete-frequency cumulative probability distributions of the frequencies samples obtained. This formation of cumulative probability distributions essentially constitutes a simple filtering of the raw probability data obtained by averaging over a very small number of sample panes. A more conventional approach might have been to use the sample of pane data to perform a Bayesian update of a prior expected probability. While this might provide similar performance it requires good prior expectations and it would certainly require much more computational effort.

Probabilistic mixture models of the feature vectors are formed and collected for all the emitter sources of interest under a wide range of environmental conditions. This is on the assumption that the feature vectors are representative samples from this probabilistic model. In doing this, the model complexity is reduced by, firstly reducing the dimensionality of the model to capture the structure with as low a dimensional representation as practicable and secondly choosing a small number of mixture components to avoid over-fitting. Here the dimensional reduction is important in reducing the computational expense that necessarily accompanies a high dimensional model while the avoidance of modelling very narrow helps to ensure that the models are not overly sensitive to absence of fully representative data.

These mixture models are used as compressed data representations of the characteristics of particular acoustic emitters that we are concerned to identify. Hidden Markov models are constructed for each emitter of interest with the hidden state representing the characteristic label of the emitter. In doing this it is important to include label mixing to accommodate modelling error and exit/entrance of emitters onto the scene. The above hidden Markov dynamic model is constructed using prior data to track emitter identity as the most probable identity given by the hidden states in the Markov model.

The combination of the above steps provides a process which is effective in providing an identification of emission sources under conditions in which the signal is of lower strength than that noise and the emission propagation environment is unknown. Advantageously, it is not necessary to have any knowledge of the emission process.

Each of these issues is specifically addressed by the process and contains steps that robustly extract frequency characteristics. Additionally, a blind feature extraction process is used that explicitly marginalises over unknown environments.

Such emissions and sources by way of example might be acoustic noise from vehicles on a track, microwave transmissions from different transmission equipments, or seismic vibrations detected at long range from some ground-based activity. However, it will be appreciated that any suitable emission or source may be detected in this manner.

The invention will now be described, with reference to the accompanying diagrammatic drawings in which;

FIG. 1 is an example of the seismic data (at two different resolutions) collected by a single sensor. Here the increase in signal in the middle of the series is due to the close approach of the vehicle to the sensor before passing on by and disappearing into the distance;

FIG. 2 shows the cumulative probability of signal crossing intervals averaged over the complete data set from four sensors and 3 vehicles, comprising some five thousand samples, using a cut-off period of 20 ms as there was very little data presenting longer intervals. It should be noted that this corresponds to a low frequency cut-off of 25 Hz that is a common value used in seismic data processing in the literature;

FIG. 3 shows the cumulative probability of a sample taken at 117 seconds in the data of FIG. 1;

FIG. 4 shows the first three eigen-cumulative-probabilities. The most significant (essentially being the mean probability itself) corresponds to a frequency shift of the main frequency component. The second eigenfunction changes the sharpness of the resonance and the least significant (of these 3) changes the high frequency component of the signal;

FIG. 5 shows a complete data set projected onto the 3-D subspace, defined by the eigenvectors obtained in FIG. 4 the different colours corresponding to different vehicles;

FIG. 6 Re-plotting of the 90 s data set of sensor '0' from FIG. 5 to show the time evolution of the data features. The time progression is indicated by the plot-point colour with black indicating early in the time series and yellow late with red being intermediate. In the cases of these two vehicles, the early (<36 s) and late (>36 s) features are clearly distinct;

FIG. 7 shows a Gaussian mixture model fitted to a complete set of data collected from multiple sensors in the presence of different moving vehicles. In this case the data associated with different vehicles is not plotted using separate colour schemes, the data is plotted from two orientations to show the structure of an almost planar subset modelled here by the yellow, cyan and magenta ellipsoids, a (green) globular cluster in the centre of the data and a (purple) prolate ellipsoid modelling the main scatter of the data;

FIG. 8 shows separate 3-component Gaussian mixture models for the 3 vehicles considered in one embodiment of the invention. The data shows that even without considering the dynamics, observed in FIG. 6 these models, although overlapping, are nonetheless are quite distinctive;

FIG. 9 shows Bayesian networks describing (a) the structure of the relationships between individual data measurements and the underlying models and (b) the network describing the concatenation of multiple measurements, where time (t in natural integer units) runs from left to right as shown by the arrows running in that direction. The key feature of the latter is the inclusion of the class as a dynamical variable. While this might seem unusual, it is an essential feature allowing earlier measurements to be forgotten and therefore allowing the network to describe a situation where vehicles enter and exit from the scene;

FIG. 10 shows classification results for two sets of data that were not used in the fitting of the data models below but for two of the vehicles used for that model building with different sensor placements.

The disclosed process is a generally applicable one but it can be best understood by reference to a specific example. Here we describe by way of such an example, a particular embodiment in the field of seismic signal processing where the aim is to identify, and ultimately track, vehicles by their seismic signatures detected at several kilometers range over variable terrain, for any vehicle speed, without knowledge of the terrain or subsurface structure and for a wide range of weather conditions.

Figure 1:
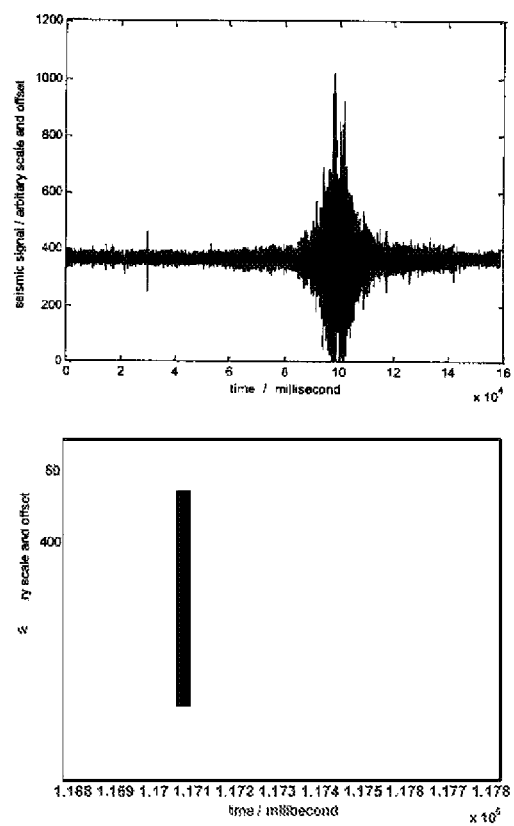

Typical data collected at a rate of a kilo-sample per second is shown in FIG. 1. In this figure, the most obvious characteristics are signal spikes resulting from the traversing of ruts and the systematic change in signal level as the vehicle approaches and recedes from the sensor location.

Given the obviously broad range of signal amplitudes, resulting for sensor-vehicle ranges from 50 m to 1 km, it is clearly necessary to focus on the temporal structure in such a way as to minimise the influence of the amplitude and to filter out the spike features that are not actually related to the vehicle.

The process sketched below involves two stages: firstly the modelling of data collected from multiple sources (vehicles in this case) and secondly the exploitation of this data to identify unknown vehicles. This modelling stage is described below.

In order to remove both spike features and sensor offsets this raw data is first band-pass filtered and then analysed for dominant frequencies by considering the data 500 consecutive samples at a time and, rather that performing a Fourier transform, determining the time intervals between successive crossings through zero (the mean of the data, after filtering) in each 500 sample window.

Figure 2:
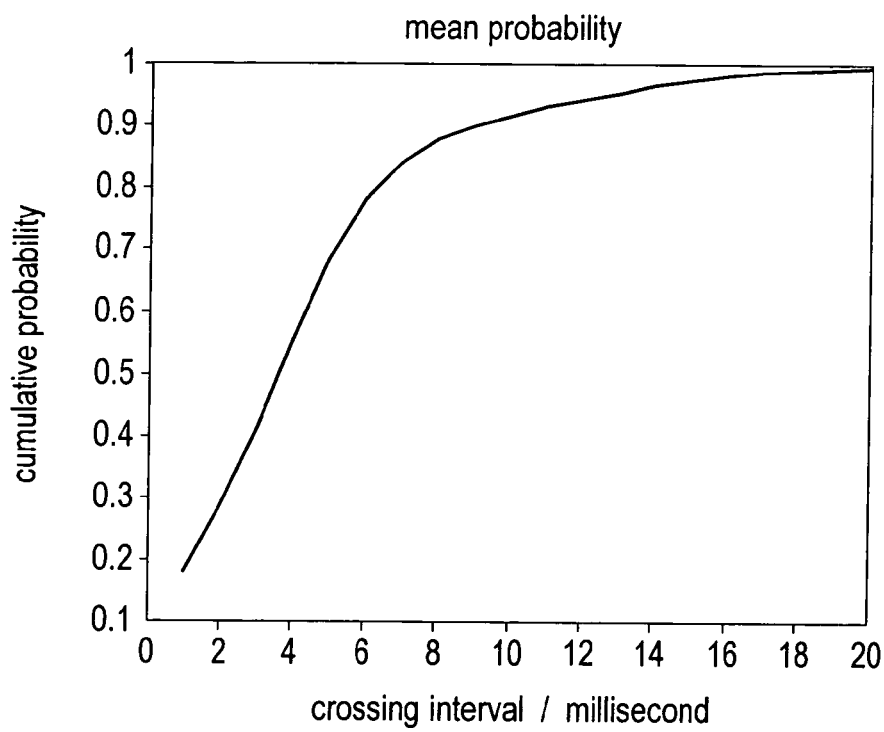

Considering all the data windows, extracted in this way, as separate samples from the probability distribution of crossing intervals it is possible to construct the mean probability distribution itself. In this simple exploration this has been constructed simply as the (normalised) histogram of the separate sample results. The resulting mean cumulative probability is shown in FIG. 2.

Figure 3:
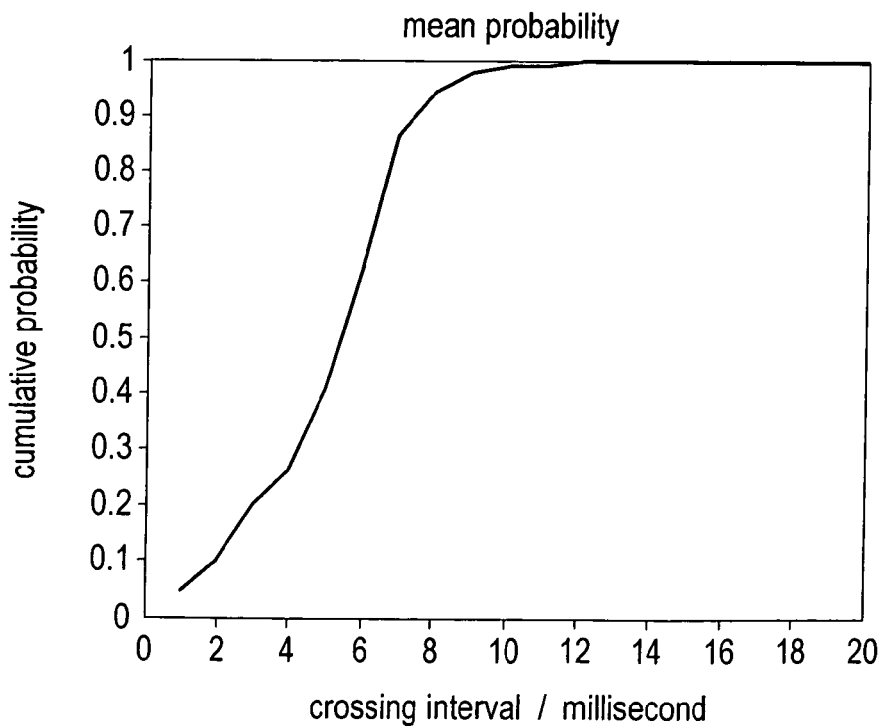
Figure 4A:
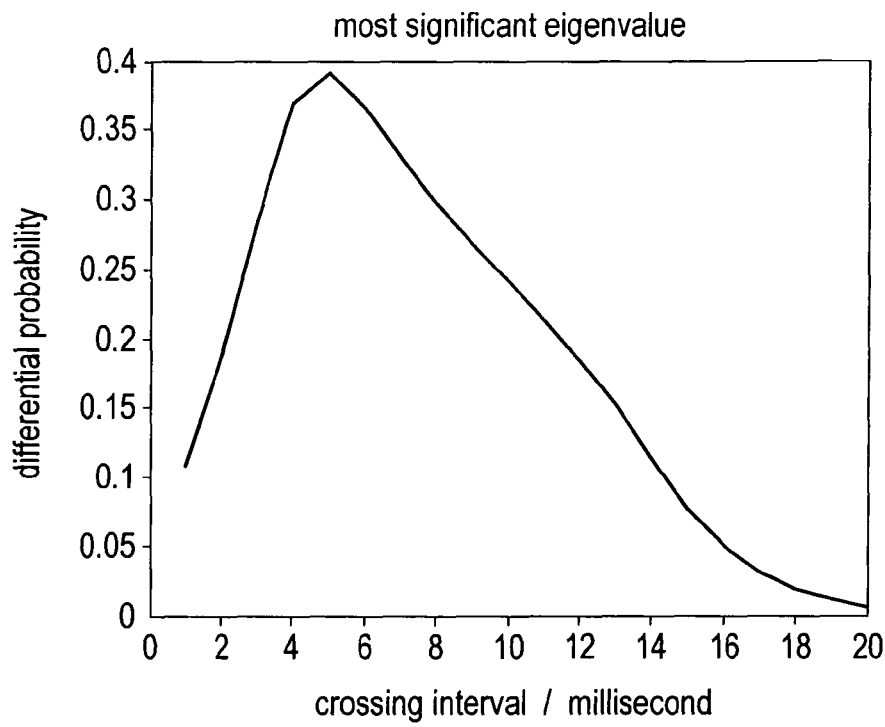
Figure 4B:
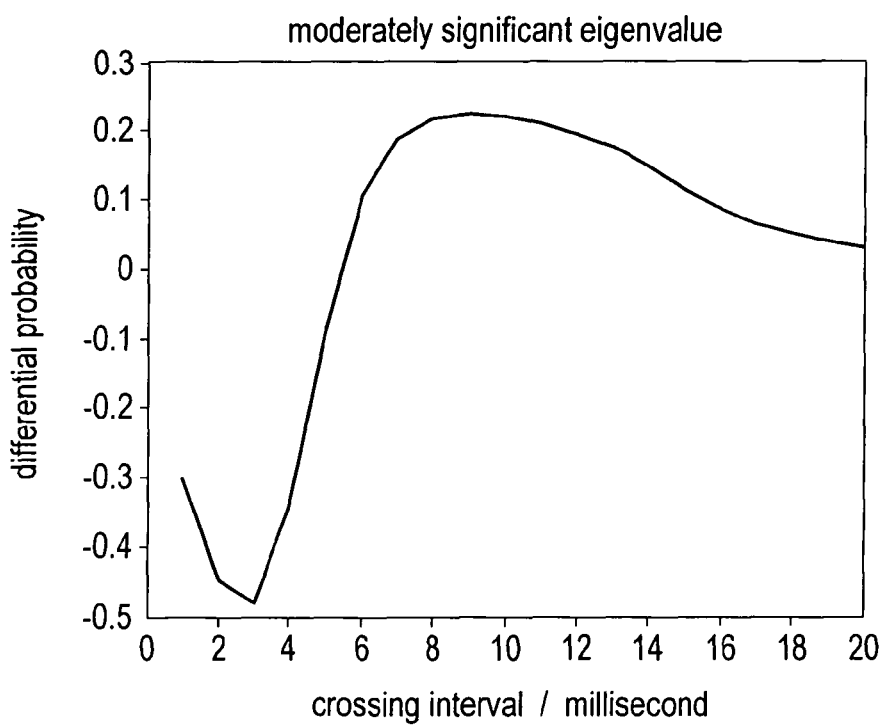
Figure 4C:
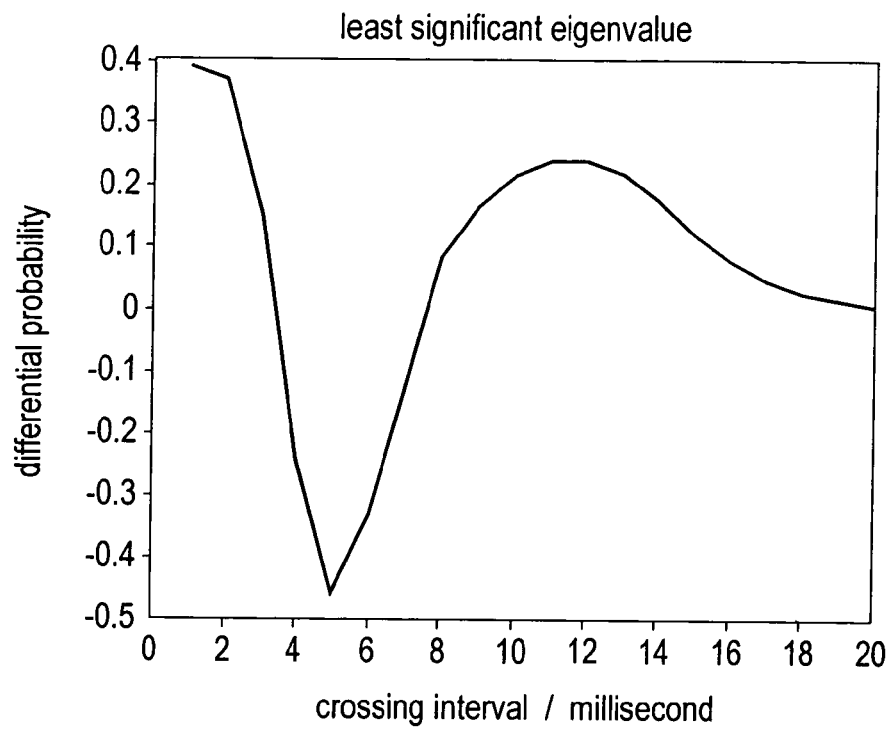

Having a normalised histogram of distributions for all sample windows in the complete data set, these are then used as the feature vectors of the data. Clearly we are concerned with the distribution of cumulative probabilities in the data, one example of which, taken from the middle of the data shown in FIG. 1, is depicted in FIG. 3. It clearly has a similar form to that of the mean in FIG. 2 but, as expected, it still shows very significant differences.

Although it would be possible to build a classifier based on all 20 components of the cumulative probability feature vectors, it is appropriate to limit the number of features to those that are most informative. If only to make the classifier more visualisable, it is even more appropriate to limit this description to 3 components. The conventional approach to this dimensional reduction is to perform a principle components analysis (PCA), and to project the data into the subspace of the (principle) components that describe the main variances of the data. If we retain only 'n components (three, say) in this PCA analysis, illustrated by the associated eigen-vector differential probabilities in FIG. 5, then we obtain an n-dimensional (3-D in this case) representation.

Figure 5:
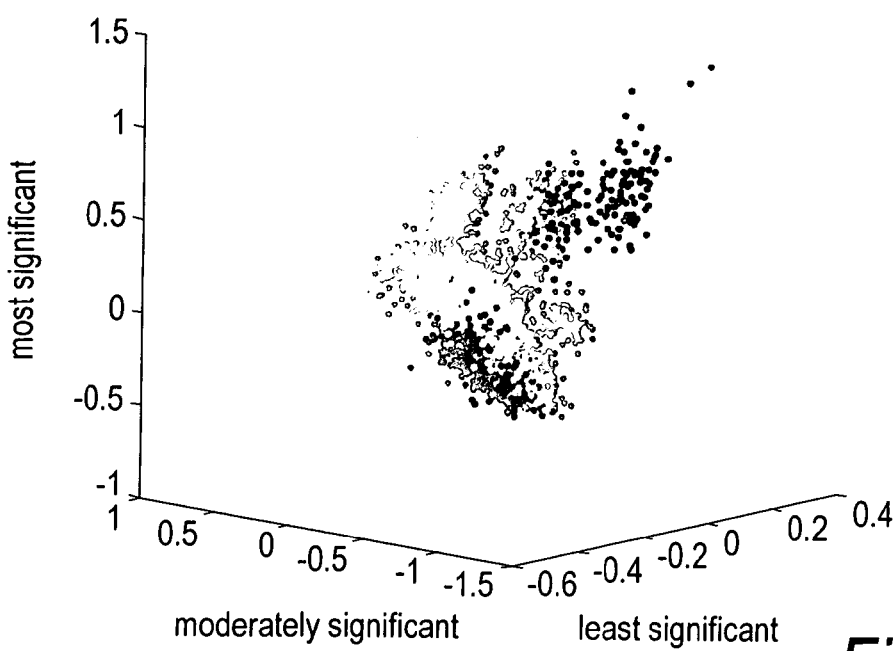

Using just these three PCA features the sensor data is displayed as a 3-D plot in FIG. 5. In this plot it is also clear that there is substructure within the data for each of the separate vehicles. This plot shows the data collected by four different sensors at different locations as the vehicles were moving at different distances from the sensors.

The data in FIG. 5 from just one sensor is re-plotted below, showing that the multi-modal structure is not a feature of the different sensor. In particular, this structure evolves in time as the vehicles travel over a range of distances within a few km of the sensors. It is therefore also clear that it is appropriate to consider a dynamical model of the data.

Of course the origin of the data is, at least qualitatively, relatively well understood. The seismic signals arise from multiple modes of propagation (surface, bulk and acoustic waves) with multiple different paths with frequency dependent attenuations that are strongly path dependent. Thus, given the means used to extract only the dominant frequency characteristic, this characteristic can switch relatively suddenly as the path between the sensor and emitting vehicle changes On the basis of these abstracted observations it is clear that we have a situation in which the characteristic (spectral) features, even of a particular vehicle, are a (strongly non-linear) function of many variables (including: range, terrain transmission medium, speed, etc) with added noise that itself may also be dependent on these variables. Given the high noise level and the computational expense of trying to fit such functions to the data there is little to be gained from such an approach. Rather, it would be sufficient to coarse-grain the space of variables and model the spread of features by a very small number of discrete variables.

Thus with added Gaussian noise, we have a 'Gaussian Mixture Model' with the individual models corresponding to such discrete variables as "seismic propagation at long range", "acoustic pickup", "seismic propagation under heavy load", etc. The point is not that these completely represent all significant events but that the bound the spread of features and that the added noise ensures that they overlap sufficiently to allow all intermediate values of variables to be interpolated.

A Gaussian mixture model will only be useful if the number of components in the mixture is relatively small. Therefore, despite the picture presented above, the construction of the model must focus on obtaining a parsimonious representation. This is most easily done by using a blind clustering approach with the physical understanding only being used to check that the derived data decomposition makes reasonable sense.

Figure 7A:
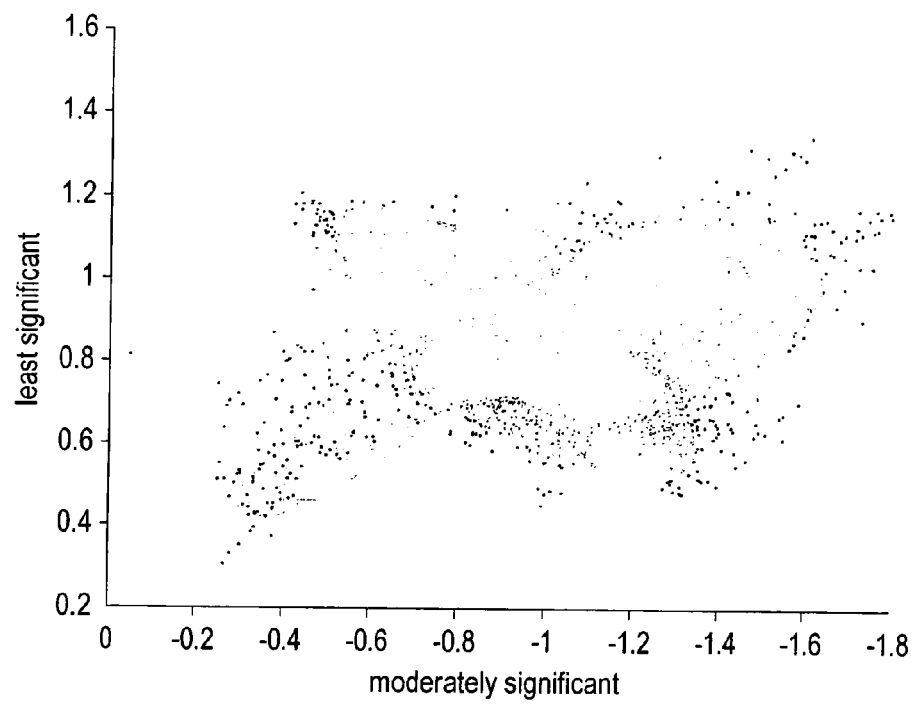
Figure 7B:
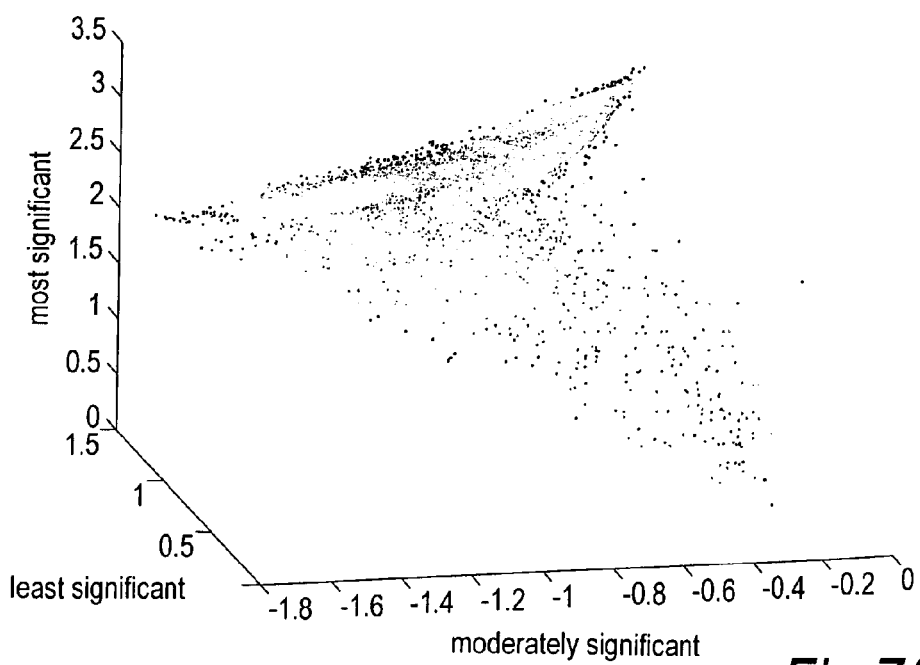

Such a Gaussian mixture model can be constructed using the stochastic EM algorithm [3] for example and is illustrated in FIG. 7.

The data models of the previous section were constructed for a complete set of data accumulated from four separate sensors of essentially identical performance, intercepting vibration data from three different vehicles. It is not surprising that the models required are complicated in that at very least; the models have to represent the different vehicle characteristics, the different ground conditions at each sensor site and the combination of both acoustic and seismic pickup. It would clearly be appealing if the complex structure shown in FIGS. 2 and 3 could be unambiguously associated with this spread of influences on the intercepted data.

In any practical application it is unlikely that we will know precisely where sensors will be located in the sense of knowing the seismic propagation properties of where they are located. It is even less likely that the location of the sensor will be known relative to the seismic sources that it is detecting. Therefore, in modelling the sensor performance, it is reasonable to imagine 'averaging' its performance over all soil-types and all distances from relevant seismic sources. In probabilistic terms, the probability of the measured data (m) given a particular target source (s) will depend strongly on the range (r) and the propagation properties (p) of the soil and given that these are not known, we will need to maginalise over these unknowns to obtain a simpler model description. Symbolically:

$$P(m|s) = \Sigma_{r,p} P(m|s,r,p) P(r) P(p)$$

Here P(r) and P(p) are just prior probabilities of likely ranges and soil-types. This mathematical picture has a relatively simple reality. We can simply perform this marginalisation by collecting data from all reasonable environments at all reasonable ranges and fitting a probabilistic model to this data. In this context, the model pictured in FIG. 7 is a representation of P(m), the probability of the measurements given that we know nothing about what generated them where they were or what the ground conditions were. I.e. we have performed a weighted sum over all (only 3 in reality) possible sources.

There are tow ways of proceeding from this point. We either look for a dynamical model representing the different switching behaviours between the components of the single model shown in FIG. 7 or we construct separate models for separate vehicles. In this embodiment we illustrate the process by constructing separate vehicle models. This is illustrated in FIG. 8.

Figure 8A:
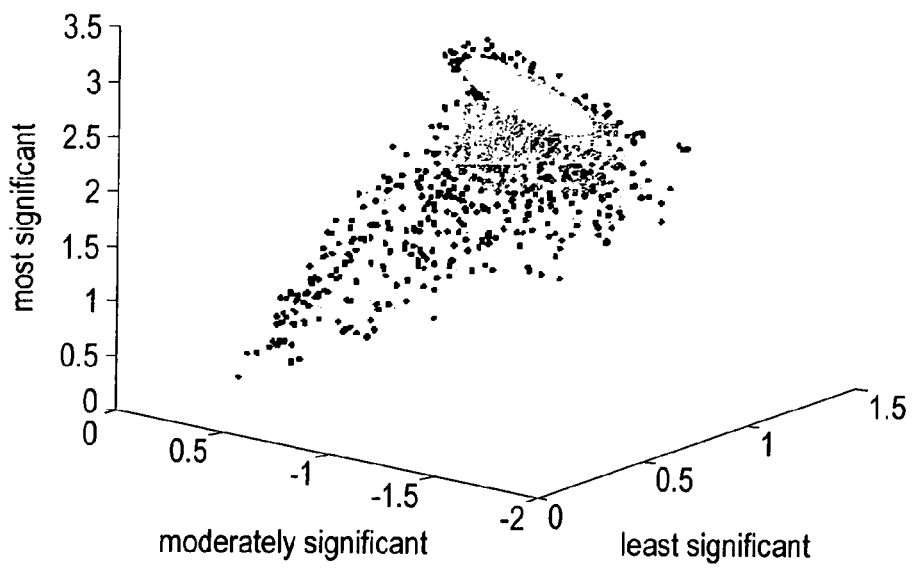
Figure 8B:
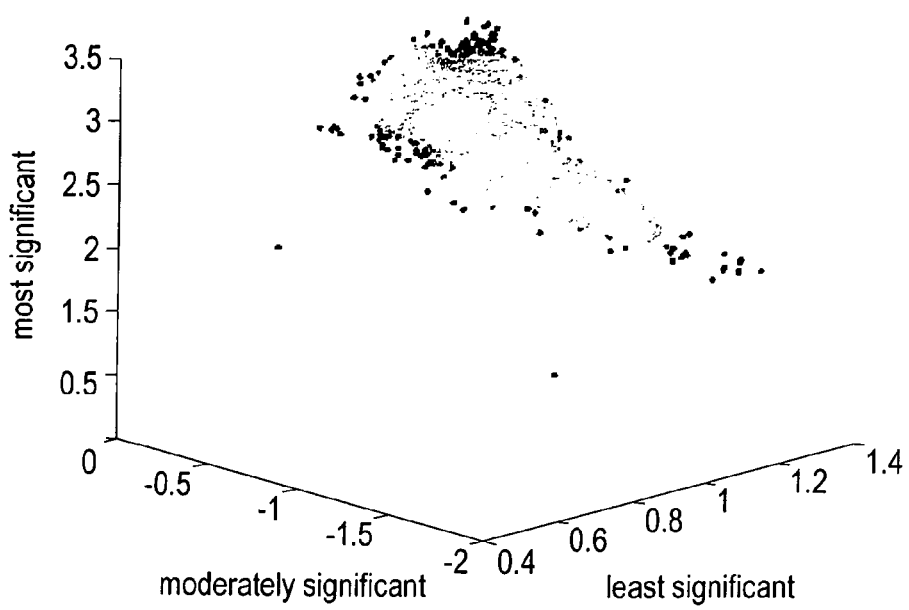
Figure 8C:
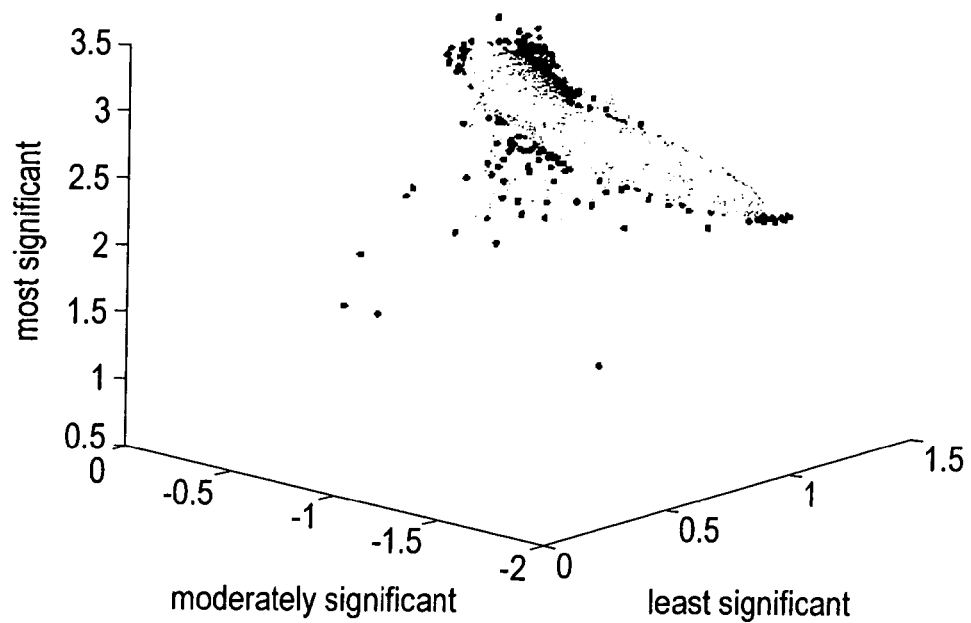

It is interesting to note that all the data modelled in FIG. 8 is adequately represented by a three component models, even though it was collected by 4 different sensors over ranges from 1.5 km to a few tens of meters.

Figure 6A:
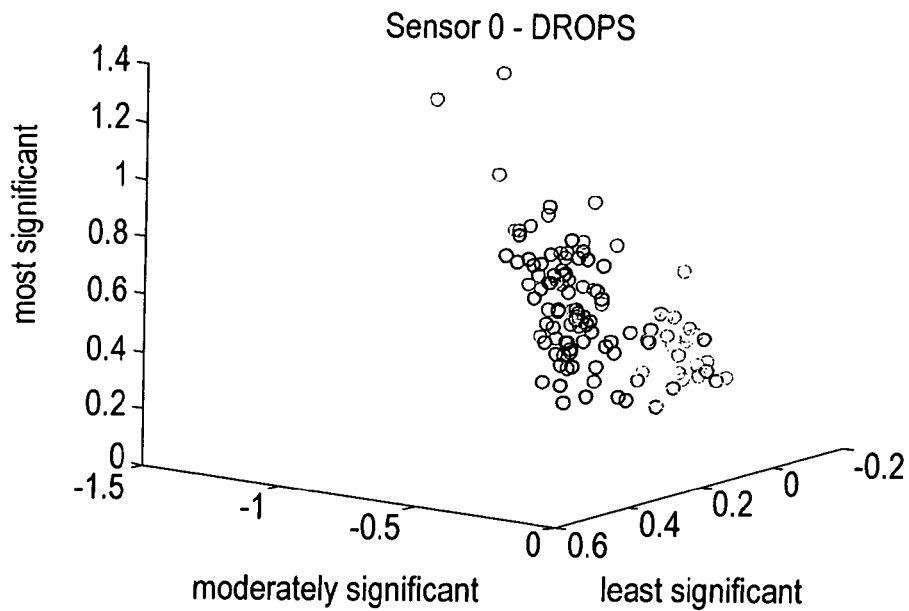
Figure 6B:
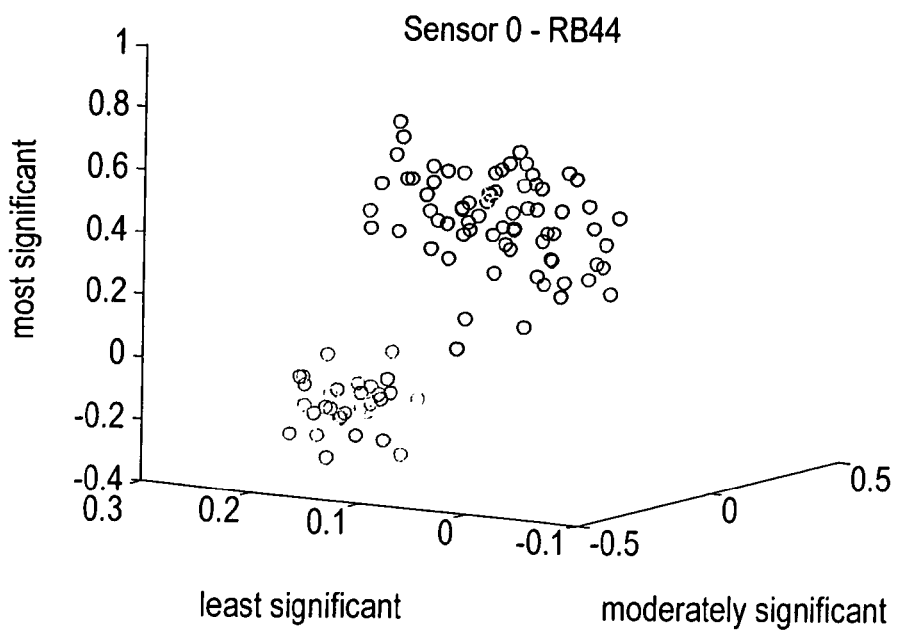

Clearly in this particular case it is not necessary to build a dynamic model based on these Gaussian mixture models but if they were less distinctive or if a common mixture model were used for the separate vehicles, then it would be necessary to build a dynamic model to capture the behaviour shown in FIG. 6.

The extension of the Gaussian mixture model to incorporate Markovian dynamics is made by identifying the Gaussian mixture model as the measurement model for the hidden states that are the components of the Gaussian mixture. Thus the probability models sketched in FIG. 8 are to be interpreted as:

$$P(m|s,g)$$

where the whole probability model for measurements Gaussian components and sources might be expressed as:

$$P(m,s,g) = P(m|s,g)P(g|s)P(s) \quad (1)$$

This is the probability of the principle component feature-space measurement, m, given the class of the source, s, and the model component, g. Then the dynamics can be included in the form of a Markov process characterised by a transition matrix, $\pi^2_{ij}$, dependent on the source:

$$P(g_t=i|g_{t-1}=j,s_t)=\pi^2_{ij}$$

This matrix can again be found from the data using the stochastic EM algorithm. In practice of course, the construction of the mixture model and dynamics might be performed in a single EM algorithm.

The explicit models constructed in the previous section might be of some interest in there own right since there is some evidence that the separate Gaussian components actually correspond to different features of the vehicle behaviour and to different terrain features. However, the primary purpose of the modelling is that of distinguishing the different vehicles and potentially identifying them (before they are in visual range).

Figure 9A:
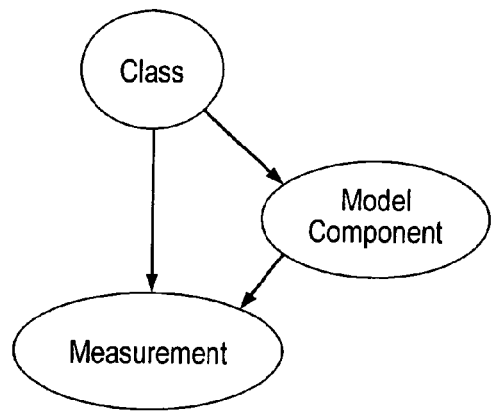

There are many different ways of doing this but in this embodiment a relatively naive but well principled (Bayesian) approach is used In defining the approach to be used, it is useful to give a simple graphical representations of the models fitted in the previous section. These are represented by the Bayesian network of FIG. 9, where the particular vehicle class defines the separate Gaussian components and they jointly determine the results of measurements. I.e. the joint probability of 'measurement' (m), the 'Source Class' (s) and 'Model Component' (g) is given by the factorisation (1) defined in the previous section, where P(g|s) is the weighting factor for the separate model components and P(s) is the prior probability of the classification.

Figure 9B:
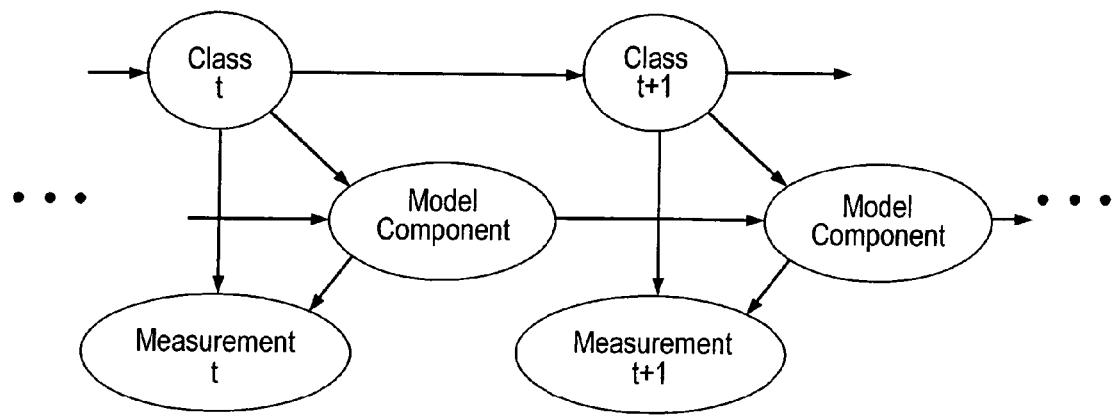
Figure 11:
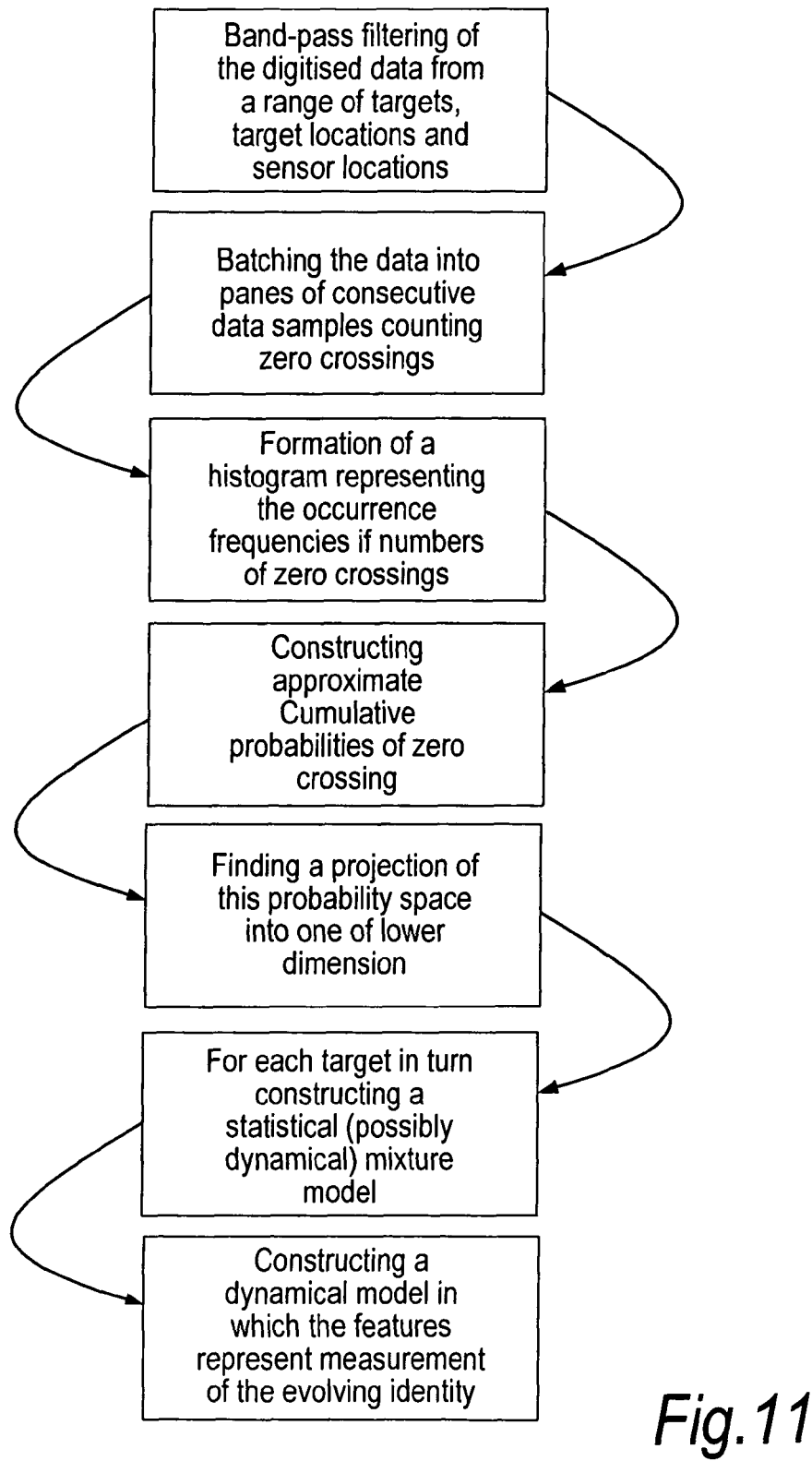
FIG. 11 shows a schematic statistical modelling process for individual targets.
Figure 12:
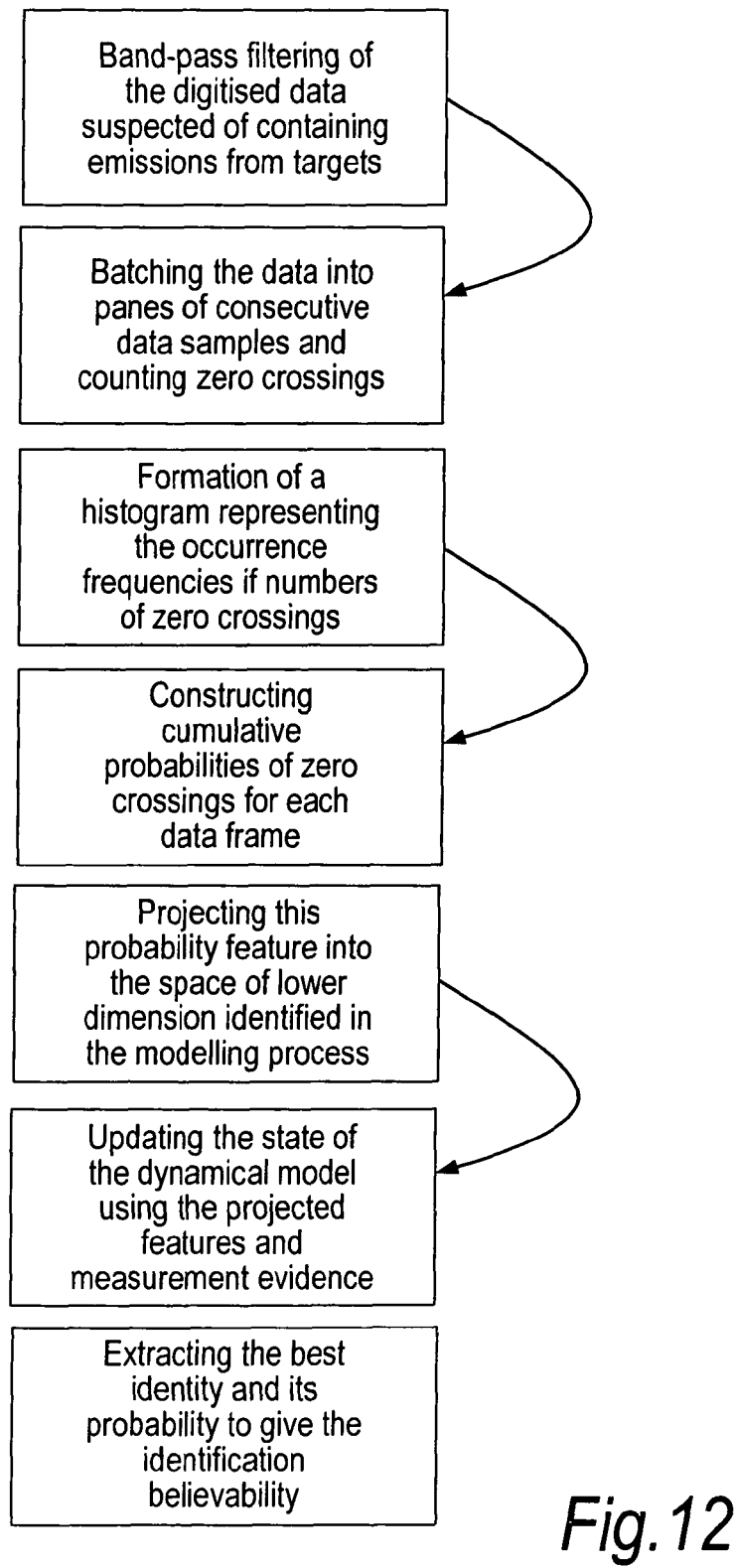
FIG. 12 shows Schematic Process for extracting individual target identities and tracks.

That prior probability essentially encodes the expected classification based on past experience. Thus, it is appropriate to associate this explicitly with the results of previous measurements. This is illustrated in FIG. 9b, where the horizontal arrows represent the conditional probabilities, $P(g_{t+1}|g_t, s_{t+1})$ and $P(s_{t+1}|s_t)$ for the Markovian dynamics of within the Gaussian mixture and the dynamics of the classification itself. This immediately raises the question as to what the latter probability should be. One might expect this to be a 'delta function' since the class of a vehicle might be expected to be fixed. However, this simple model needs to incorporate a way of progressively forgetting old measurements, if only to avoid floating-point underflow absolutely zeroing the probability of classes for which there is currently little evidence.

In the particular system example considered here there are 3 classes. Given this discrete class space the most obvious dynamical model is a discrete Markov model characterised by the (3×3) transition probability matrix $r_{ij}=P(s_{t+1}=j|s_t=i)$. Clearly class needs to be considered to be nearly constant, so this matrix is almost diagonal. For the 0.5 second interval between 'measurements' an appropriate matrix is might be:

$$r_{ij} = \begin{bmatrix} 0.990 & 0.005 & 0.005 \\ 0.005 & 0.990 & 0.005 \\ 0.005 & 0.005 & 0.990 \end{bmatrix}$$

Equation (2) gives the joint probability of all the stochastic variables of the problem. In Classification, we are interested in the probability of the Source Class, given all the measurements. This is easily obtained (in iterative form) from equation (2) by applying Bayes rule:

$$P(s_{t+1}, g_{t+1} | M_{t+1}) = \frac{\sum_{s_t,g_t} P(m_{t+1}|s_{t+1}, g_{t+1})P(g_{t+1}|g_t, s_{t+1})}{\sum_{s_t,s_{t+1},g_t} P(m_{t+1}|s_{t+1}, g_{t+1})P(g_{t+1}|g_t, s_{t+1})} \cdot \frac{P(s_{t+1}|s_t)P(s_t, g_t | M_t)}{P(s_{t+1}|s_t)P(s_t, g_t | M_t)} \quad (2)$$

Here we have used the notation that $M_t \equiv \{m_k : \forall k \leq t\}$ the set of all measurements up till time t. The probability of the class itself is obtained by marginalising over the Gaussian modes and it might be reasonable to take the most probable of the classers as the best estimate of the identity The best test of the approach is to apply this recogniser to a set of data obtained under different conditions to those used in the model building, even including other vehicle types and including different terrain. The results of such a test are shown in FIG. 10 indicating the practicality of the approach.

The invention claimed is:

1. A process for identifying and tracking a target, comprising:
    detecting emissions emitted by the target;
    processing emissions data detected using a series of statistical manipulation, the series of statistical manipulations comprising:
        filtering the seismic data detected;
        extracting statistical frequency information;
        constructing a statistical mixture model describing the emission characteristics of the target observed in a range of different environments; and
        constructing a dynamic mixture model construction based on existing known data and identification of an unknown target by convergence of the model to a state characteristic of the target; and
    identifying and tracking the target in which the emissions detected are detected passively by at least one sensor.

2. A process as recited in claim 1, in which the emissions detected are acoustic in nature and are detected at some distance from the target after passage of acoustic vibrations though intervening solid liquid or gaseous medium.

3. A process as recited in claim 2, in which the emissions detected are of seismic nature and are detected passively by seismic sensors.

4. A process as recited in claim 1, in which the emissions detected are of electromagnetic nature and are detected passively by broad band electromagnetic sensors.

5. A process as described in claim 1, where the dynamic model is constructed with two parts: a first part comprising separate models for individual targets, and a second part comprising a dynamic model incorporating stochastic switching between models of all targets of interest.

6. A process as recited in claim 1, in which constructions of the statistical mixture model and the dynamic mixture model are performed off-line on data collected from known examples of targets under a range of representative conditions, and where the identifying is performed on-line using previously constructed models and data collected under circumstances where the target is unknown.

7. A process as recited in claim 1, in which the dynamic model is a Hidden Markov model where hidden states correspond to individual target models and transitions between the states correspond to changes of target identity, with actual identity being obtained by comparisons of probabilities of the identity states of the model.

8. A process as recited in claim 7, in which the states of the Hidden Markov model are associated with individual model components, and the transitions involve both changes of identity and changes of component so that an identification is in terms of both the target identity and the state of the target, constituting both identification and generalized tracking.

9. A process as recited in claim 1, in which statistical frequency information is a cumulative probability density or discrete cumulative probability distribution.

10. A process as recited in claim 9, in which statistical frequency information is obtained by averaging over occurrences of frequencies obtained by counting zero-crossings.

11. A process as recited in claim 7, in which individual model components in the Hidden Markov model are associated with motion of a vehicle at different distances from the sensor or on different terrains so that identification is in terms of both the target identity and location of the target.

12. A process as recited in the claim 11, in which the location and identity information from an array of sensors can be used to track the detected vehicle in space, possibly using map data to provide terrain information to remove any ambiguities.

13. A process as recited in claim 5, in which constructions of the statistical mixture model and the dynamic mixture model are performed off-line on data collected from known examples of targets under a range of representative conditions, and where the identifying is performed on-line using previously constructed models and data collected under circumstances where the target is unknown.

14. A process as recited in claim 2, in which the dynamic model is a Hidden Markov model where hidden states correspond to individual target models and transitions between the states correspond to changes of target identity, with actual identity being obtained by comparisons of probabilities of the identity states of the model.

15. A process as recited in claim 3, in which the dynamic model is a Hidden Markov model where hidden states correspond to individual target models and transitions between the states correspond to changes of target identity, with actual identity being obtained by comparisons of probabilities of the identity states of the model.

16. A process as recited in claim 4, in which the dynamic model is a Hidden Markov model where hidden states correspond to individual target models and transitions between the states correspond to changes of target identity, with actual identity being obtained by comparisons of probabilities of the identity states of the model.

* * * * *